(12) United States Patent
Saito et al.

(10) Patent No.: US 6,678,071 B1
(45) Date of Patent: Jan. 13, 2004

(54) IMAGE-READING APPARATUS

(75) Inventors: Takeyasu Saito, Fukuoka (JP); Jun Hasegawa, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/465,072

(22) Filed: Dec. 16, 1999

(30) Foreign Application Priority Data

Dec. 16, 1998 (JP) ............................................. 10-357533

(51) Int. Cl.[7] .......................... G06F 15/00; G06F 13/00
(52) U.S. Cl. ........................ 358/1.2; 358/449; 358/451; 358/488; 382/299
(58) Field of Search ......................... 358/1.2, 449, 488, 358/451; 382/298, 293

(56) References Cited

U.S. PATENT DOCUMENTS

| | | | | |
|---|---|---|---|---|
| 5,128,778 A | * | 7/1992 | Blitz et al. ................... 348/240 |
| 5,208,902 A | * | 5/1993 | Kumon ......................... 355/102 |
| 5,249,069 A | | 9/1993 | Petilli ........................... 358/488 |
| 5,713,070 A | * | 1/1998 | Ohkubo ........................ 358/401 |
| 5,798,843 A | | 8/1998 | Yamamoto et al. .......... 358/404 |
| 5,815,289 A | | 9/1998 | Yoshida et al. .............. 358/468 |
| 5,870,508 A | * | 2/1999 | Park ............................. 358/488 |
| 6,088,138 A | | 7/2000 | Sakai et al. .................. 358/540 |
| 6,339,466 B1 | * | 1/2002 | Matama ........................ 355/40 |

* cited by examiner

*Primary Examiner*—Edward Coles
*Assistant Examiner*—Alan Rahimi
(74) *Attorney, Agent, or Firm*—RatnerPrestia

(57) ABSTRACT

An image-reading apparatus expands a scanning area along a side at each of both ends in a width direction and a longitudinal direction of a paper P, when reading an image on the paper P fed into it by an image-reading unit comprising scanner heads 7a and 7b, in order to embrace the paper P entirely within the scanning area even when the paper P passes the image-reading unit while in a skew orientation, thereby enabling the apparatus to read the image without any defect, including the image in a marginal portion of the paper P.

2 Claims, 5 Drawing Sheets

IMAGE-READING APPARATUS

FIELD OF THE INVENTION

The present invention relates to an image-reading apparatus such as an image scanner and the like. In particular, the invention relates to an image-reading apparatus devised to be capable of reliably reading an entire image without bearing a deficiency in the image, even if a paper fed from a paper feeder to an image-reading unit advances obliquely (i.e. paper skews).

BACKGROUND OF THE INVENTION

Image scanners have been in use for a long while as apparatuses for reading a variety of original paper sheets in large volume for a purpose of, for example, electronic filing. Among those image scanners, certain types that are intended for original paper sheet in a size as small as near to a postcard to about A3-size are generally provided with an automatic paper feeding mechanism (hereinafter simply referred to as "ADF") for carrying the original paper sheets to be read, and forwarding them one sheet at a time to an image-reading unit.

The ADF comprises a paper-feeding hopper (hereinafter referred to simply as "hopper") for carrying a stack of papers (original paper sheets), and a paper-feeding roller disposed on an upper side of the hopper for picking up and forwarding a paper on an uppermost layer by being in contact with it. As a basic structure of the ADF, it further comprises a separation roller and a retard roller positioned in vicinity of a discharge opening for preventing a multiple feeding of papers. In addition, the hopper is provided with a pair of guides for restraining a position of loaded papers widthwise in order to feed the papers straight. Paper is forwarded toward a conveyor path to the image-reading unit in the same orientation without a skew, when the pair of guides is adjusted of their position according to a size of the paper.

Also, by providing the guides with a positional sensor for producing a signal according to a distance that the guides are moved corresponding to a size of the paper, it can determine in advance the size of paper when a position of the guides is set according to a width of the paper. Hence, the image-reading unit is able to carry out readings according to the size of paper by assigning a scanning module in the image-reading unit with a reading area according to a determined value of the paper size.

Papers sent out from the paper-feeding roller tend to skew, if the papers are arranged in a disorderly manner, or the guides on the hopper are left unfitted with a width of the papers, when a sheaf of the papers is loaded on the hopper. Also, in the case of a sheaf of papers consisting of a variety of different size papers, the guides are set in positions on the hopper according to a paper of the largest size among them. For this reason, papers of smaller size are guided without being in contact with the guides, or with only one of the lateral sides being in contact with one of the guides, thereby resulting in unsteady feeding of the papers. Accordingly, it causes the papers to skew more frequently.

On the other hand, when papers of A4-size are used, for example, a reading area for the A4-size is designated automatically in the image-reading unit by way of setting the guides on the hopper in positions. Therefore, the image reading-unit is able to scan over an entire image on the paper, and the image is input as a standard form of image data into a host-computer without any deficiency in a border area of the paper, if the paper is fed in the normal orientation from the hopper.

If an A4-size paper is fed with a skew, however, a marginal area of the paper lies off the scanning area, since the image-reading unit designates the scanning area corresponding to the A4-size. Hence, the image-reading unit produces an image data partially in defect of the marginal area, and makes a reproduced image defective, because it is unable to match the scan with the entire image on the paper.

Some techniques have been suggested heretofore to cope with a skew paper of this nature that occurs from the hopper to the image-reading unit, in that a sensor is provided along the conveyor path for papers in order to detect a skew, and a processing of image is executed in response to a detection of skew by the sensor. For instance, the apparatus calculates a magnitude of skew of the paper according to a signal from the sensor, and rotates a scanning area of the image-reading unit in proportion to a direction and an angle of the skew paper, so as to match the scanning area with the paper. However, if the apparatus carries out a controlled rotation of the scanning area in this manner every time a paper skews, it slows a speed of reading. Hence, it substantially decreases an efficiency of the image reading process, when a large number of papers needs to be processed.

As described, a partial defect in image data due to a skew paper has been a problem with the image-reading apparatus of the prior art, and countermeasures for it have still been unsatisfactory.

SUMMARY OF THE INVENTION

A problem to be solved in this invention is to provide an image-reading apparatus that produces no partial defect in image data that is attributable to a skew paper. The problem is solved with a simple method that is to embrace a portion of image lying off a scanning area due to the skew of paper by expanding the scanning area for reading in advance according to a size of the paper.

The present invention relates to an image-reading apparatus, in which an image-reading unit scans over an image on a paper being fed in, and outputs the image on the paper as an image data, and that a reading area of the image-reading unit is set to be greater than a size of the paper. The image-reading apparatus of this invention then reduces the image read by the image-reading unit into the size of the paper, and outputs the reduced data as an image data.

Since the apparatus of the above-described structure reads an image in an area greater than a size of paper, it is able to pick up the image data in a size of the original paper without causing a deficiency in the image even if the paper skews.

DETAILED DESCRIPTION OF THE PREFERRED EMBODIMENT

An exemplary embodiment of the present invention will be described hereinafter by referring to the accompanying figures.

Exemplary Embodiment

Figure 1:
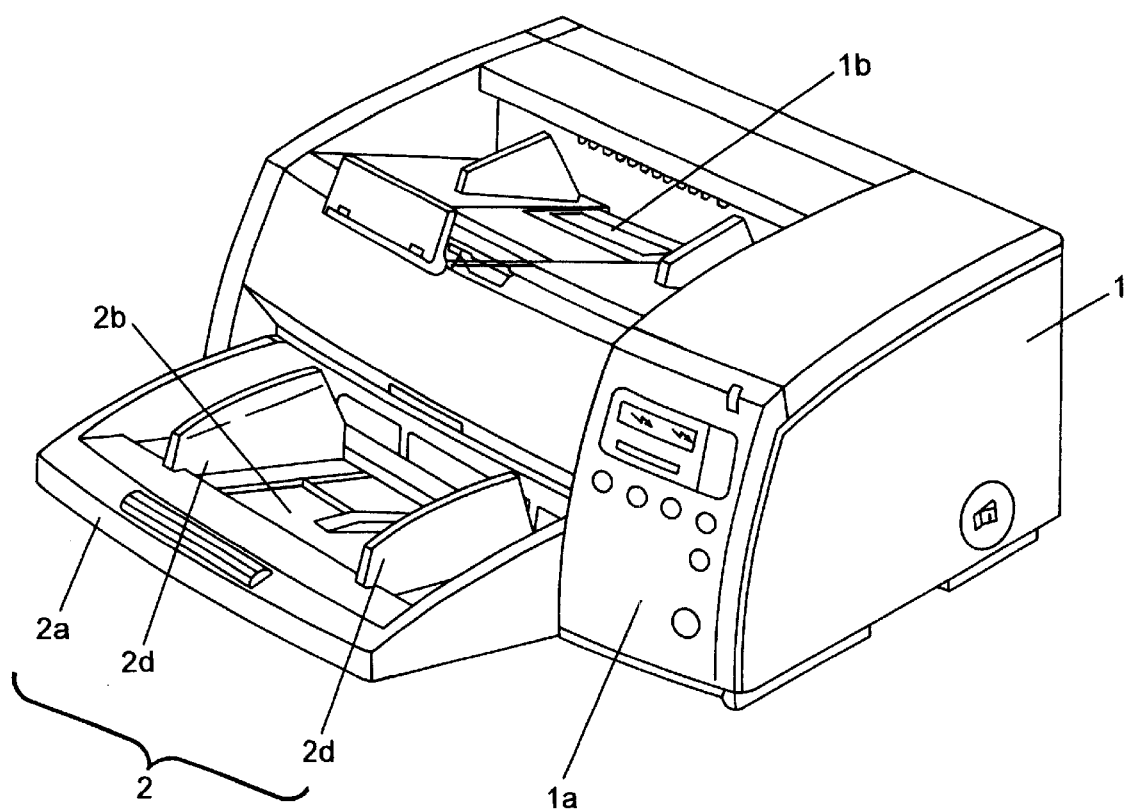
FIG. 1 is a general perspective view depicting an image reading apparatus of the present invention.

FIG. 1 is a perspective view depicting a general outline of an image-reading apparatus of the present invention.

As shown in FIG. 1, the image-reading apparatus comprises a main body 1 equipped internally with a scanning module utilizing an optical system and a conveyor path for papers, and an ADF 2. The main body 1 is provided with a control panel 1a on a front surface of it, and a controller (not shown in the figure) in its inside for controlling all devices that constitute the image-reading apparatus. The main body 1 is further provided with a recovering tray 1b on an upper surface of it for receiving papers supplied from the ADF 2, and made through with an image-reading by the scanning module.

The ADF 2 is provided with function of a hopper for carrying paper and sending it out toward the conveyor path in the main body 1, and function of preventing a multiple feeding of the paper. A diagrammatic view of it, including the conveyor path for paper is shown in FIG. 2.

The ADF 2 comprises a hopper 2b, which is assembled into a housing 2a in a such manner as to be vertically rotatable. The ADF 2 is provided with a paper detection sensor 2c on a bottom surface side of the hopper 2b for determining whether paper P is loaded. The ADF 2 is also provided with a pair of guides 2d on the hopper 2b for guiding the paper P toward a feeding direction while holding widthwise against both sides of the paper P. These guides 2d are movable widthwise with respect to the paper P in an interlocked motion with a rack-and pinion mechanism mounted within the housing 2a. A paper-size sensor 2e is installed in the housing 2a for reading an intervening space between the pair of guides 2d. Size of the paper P can be determined through a reading of the intervening space. In other words, the paper-size sensor 2e reads the intervening space between the pair of guides 2d, as the guides 2d are shifted according to a width of the paper P when loading and setting the paper P on the hopper 2b. In this way, a width dimension of the paper P is determined indirectly.

Figure 2:
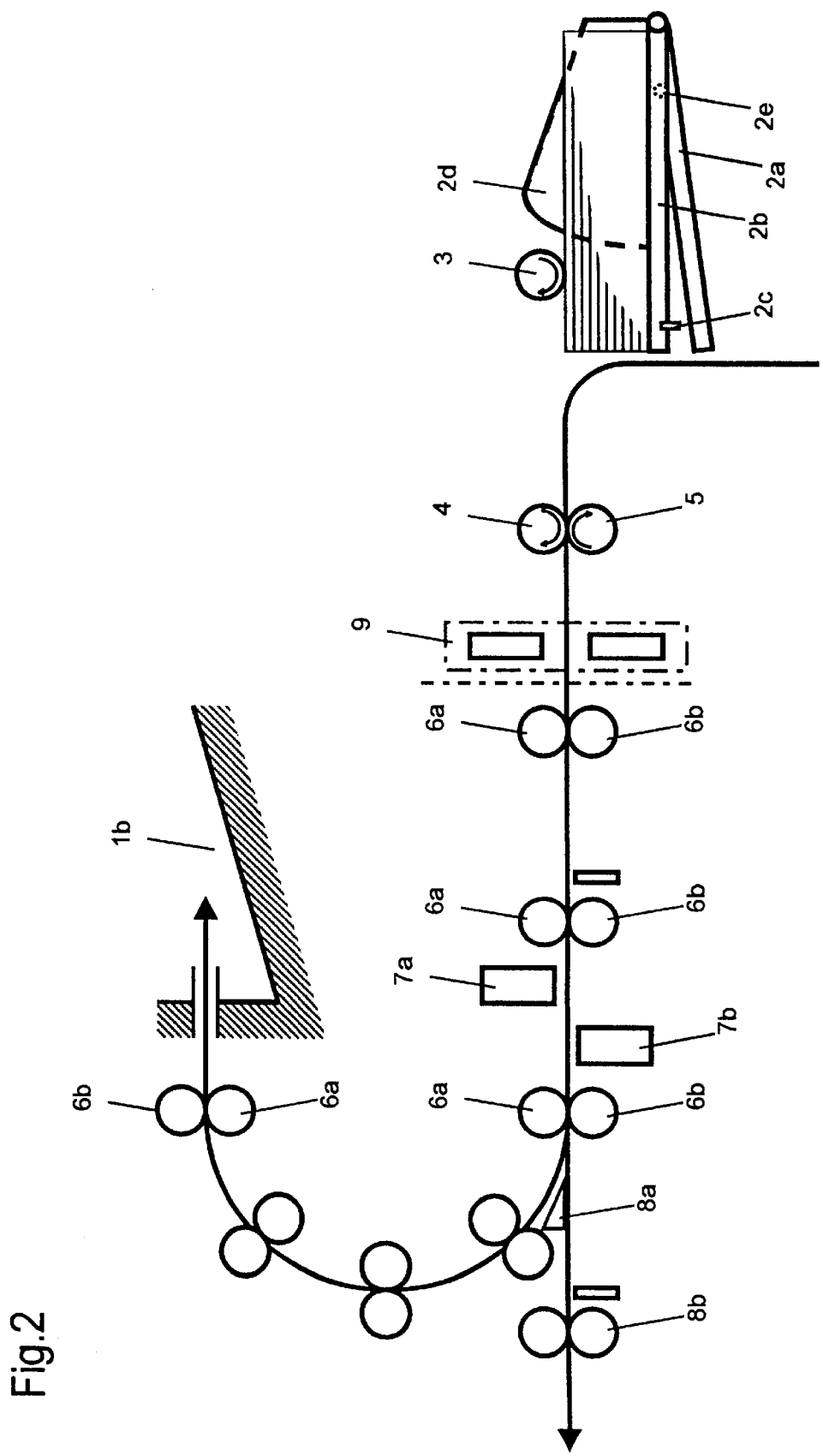
FIG. 2 is a diagrammatic view depicting an automatic paper-feeding mechanism from a paper-feeding hopper to a conveyor path.

The ADF 2 is provided with a paper feeding roller 3 for sending out the paper P on the hopper 2b by picking them up one after another, a separation roller 4 for preventing a multiple feeding of the paper, and a retard roller 5 containing an internal torque-limiter, as shown in FIG. 2. A paper conveyor path leading to the recovering tray 1b on top of the main body 1 is connected at a downstream of the separation roller 4 and the retard roller 5. The paper conveyor path is provided with pairs of conveyor rollers 6a and 6b in a plurality of stages. A scanner head 7a and another scanner head 7b for reading images are positioned as an image-reading unit between a second stage and a third stage of the conveyor rollers 6a and 6b.

In this connection, the scanner head 7a on the upper side reads an image on a front surface of the paper P sent out from the hopper 2b, and the scanner head 7b on the lower side reads an image on a back surface of the paper P. In addition, an exemplary embodiment shown in FIG. 2 is provided with a structure employing a gate 8a at an immediate downstream of the scanner head 7b for directing the paper toward a discharge roller 8b by switching the conveyor from toward the recovering tray 1b.

The scanner heads 7a and 7b are allowed to start reading images of the paper P based on a time, at which a leading side of the paper P passes after the paper P is sent out from the hopper 2b. A timing sensor 9 is provided at an immediate downstream of the separation roller 4 and the retard roller 5 for a purpose of detecting the time the leading side of the paper P passes, including also a purpose of detecting whether the paper P is advancing on a skew.

Figure 3A:
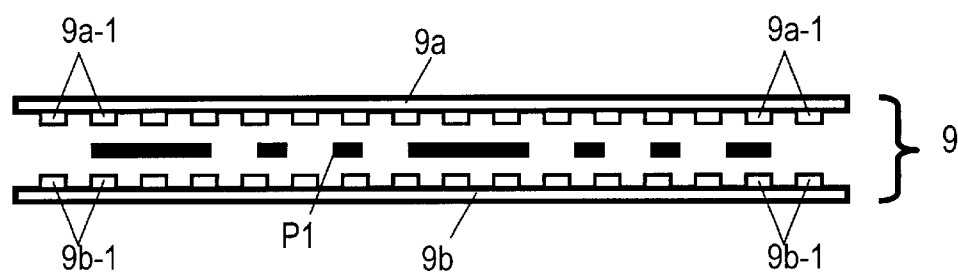
FIG. 3A is a detail drawing of a timing sensor as viewed from a side of the paper feeding hopper.
Figure 3B:
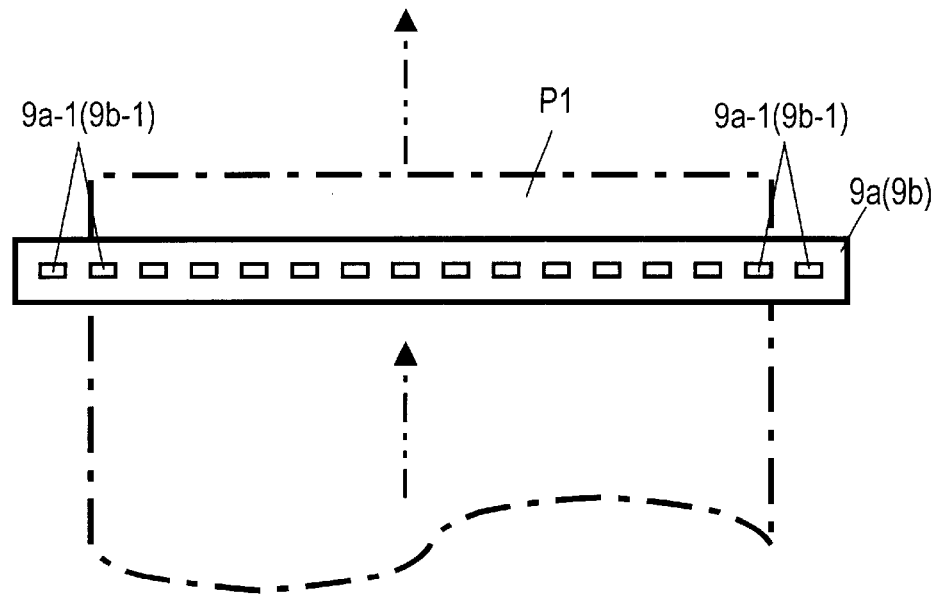
FIG. 3B is a diagrammatic plan view in detail of the timing sensor, depicting a positional relation between a size of paper and light-emitting and light-receiving components.
Figure 3C:
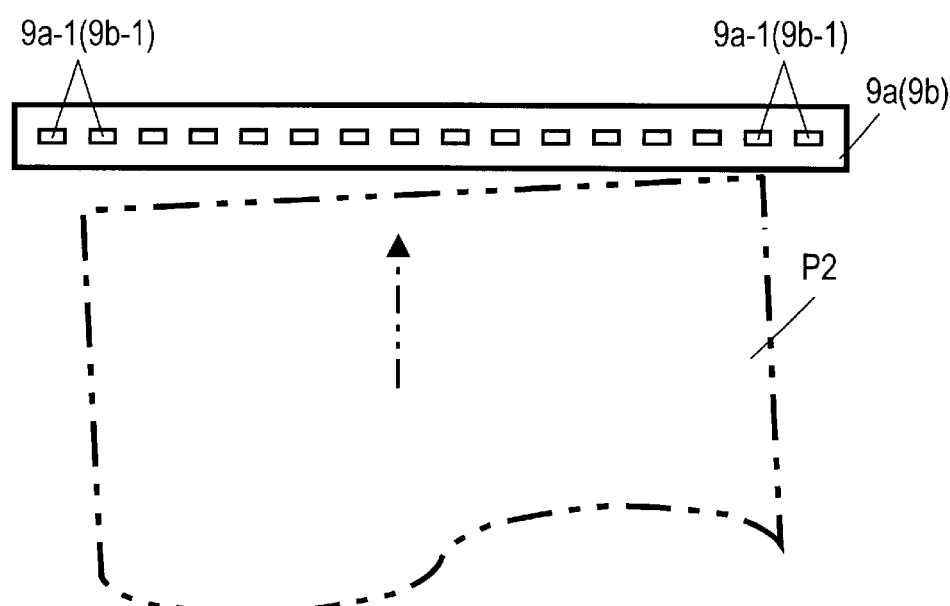
FIG. 3C is another diagrammatic plan view depicting a positional relation between the paper and the timing sensor, in a case the paper skews.

FIG. 3A, FIG. 3B and FIG. 3C show general views of the timing sensor 9. FIG. 3A shows the timing sensor 9 as viewed from a side of the hopper 2b toward the paper feeding direction, and FIG. 3B and FIG. 3C are plan views showing positional relation of it with respect to the paper.

The timing sensor 9 is constructed of an optical sensor which is a combination of a bar-shaped light-emitting side element 9a and a bar-shaped light-receiving side element 9b. The light-emitting side element 9a is formed into a shape of bar in a length longer than the width dimension of the largest paper that can be loaded on the hopper 2b, and it is provided with a plurality of light-emitting components 9a-1 utilizing LED's along a longitudinal direction. The light-receiving side element 9b also has a shape of bar in the same length as the light-emitting side element 9a. Light-receiving components 9b-1 utilizing phototransistors are arranged in a manner to correspond with the light-emitting elements 9a-1. The light-emitting components 9a-1 and the light-receiving components 9b-1 are arranged in a direction orthogonal to the direction of the paper, as it is fed in the normal orientation, i.e. the direction without skew, from the hopper 2b.

With the light-emitting components 9a-1 and the light-receiving components 9b-1 in this arrangement, all light paths of the light-emitting and the light-receiving components 9a-1 and 9b-1 are cut off at nearly the same time, when a paper P1 is conveyed in the normal orientation as depicted by a chain line in FIG. 3B. Therefore, the timing sensor 9 may be made to output a signal by defining this cut-off time as a passing time of the leading side of the paper P1. On the other hand, when a paper P2 passes an area of the timing sensor 9 while being skewed obliquely off toward the left, as shown by a chain double-dashed line in FIG. 3C, the light paths are cut off successively at regular time intervals from the light-emitting and the light-receiving components 9a-1 and 9b-1 positioned on the right side toward those on the left as the paper P2 advances. Thus, a control unit 10 for detecting a signal of the timing sensor 9 judges it as being on a skew, if there is such a time difference in cutting off the individual light paths of the light-emitting and the light-receiving components 9a-1 and 9b-1. In this instance, a passing time of a leading side of the paper P2 is set according to a cut-off time of a light path of the light-emitting and the light-receiving components 9a-1 and 9b-1 on the right end in the positioning direction of the timing sensor 9.

Figure 4:
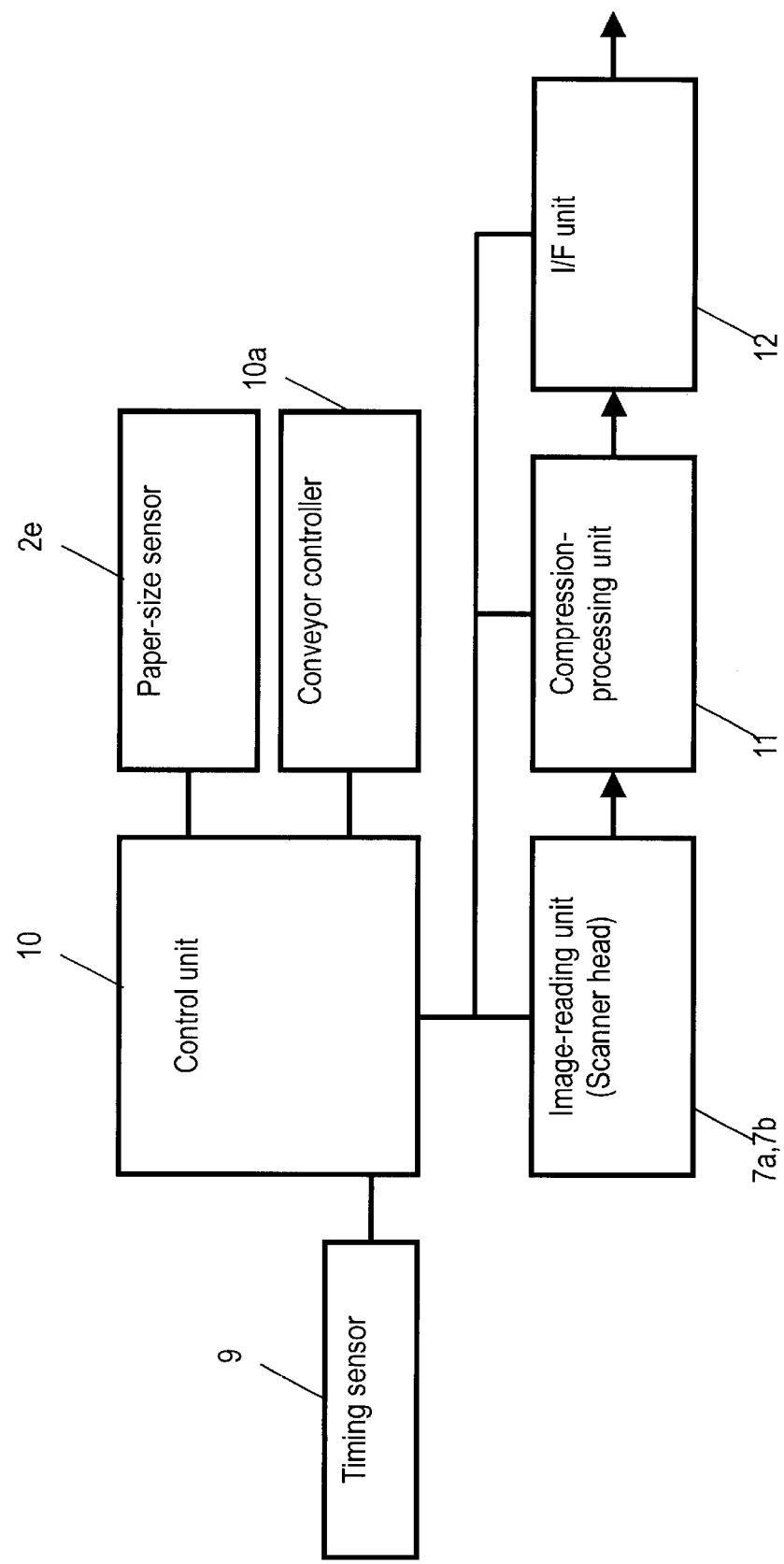
FIG. 4 is a block diagram depicting a control of the automatic paper feeding mechanism for feeding a paper and reading an image.

FIG. 4 is a control block diagram for conveyance and image reading of the paper P.

The control unit 10 for controlling each unit that composes the image-reading apparatus is connected with a conveyor controller 10a for controlling an operation of a group of all rollers positioned on the conveyor path of the paper P, including the paper feeding roller 3 at the starting end, the paper-size sensor 2e, and the timing sensor 9. The formerly described paper size-sensor 2e inputs a size determination signal for the paper P loaded in the hopper 2b. The timing sensor 9 inputs passage signals for the leading side and tail side of the paper P. The control unit 10 calculates a size of the paper P according to the size determination signal from the paper-size sensor 2e. The control unit 10 sets a scanning area of the image-reading unit composed of the scanner heads 7a and 7b to be slightly greater in area than that of the A4 size, if it judges the paper P as being the A4 size, for example (a detail of setting the scanning area will be described later). In addition, the control unit 10 calculates a passage time of the paper P according to an input time of a passage signal for the leading side of the paper P and an input time of another passage signal for the tail side of the paper P received from the timing sensor 9. The control unit 10 then determines a reading length needed for the paper P according to a result of the calculation.

Figure 5A:
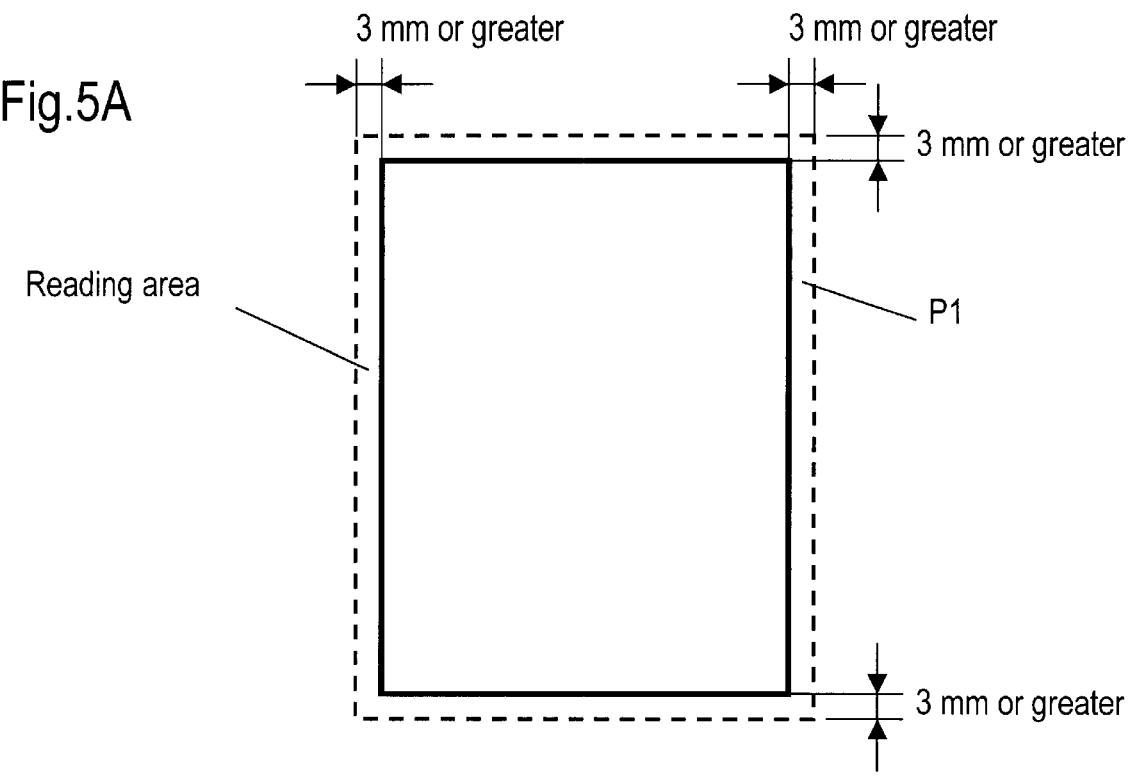
FIG. 5A is a diagrammatic view depicting an expanded reading area with respect to a regular size paper, as the paper is fed in the normal orientation.

In the present invention, a reading area for the image-reading unit to read an image on the paper P is set to be in a range equal to 3 mm or larger from both sides in the width direction of the paper P as shown in FIG. 5A, regardless of the paper size. After the reading, the image-reading unit reduces an image data into the regular size again, and inputs it to a host computer. In other words, the image-reading unit receives an order from the control unit 10 to set the scanning area into a range expanded by 3 mm from both sides on top of an A4-width, as shown in FIG. 5A, if the paper-size sensor 2e in the control block diagram of FIG. 4 determines the paper set on the hopper 2b as being A4-size, for example. The control unit 10 then outputs an image data from a compression-processing unit 11 to the host computer via an interface unit 12 in order to reduce the image data, which has been read with the two sides expanded by 3 mm in the width direction, into the regular A4 size.

Provided that a reading resolution is 200 (dots per inch), or 200/25.4 (dots per mm) for instance, the image-reading unit needs to be greater in size by a margin of 200/25.4 (dots per mm)×6 (mm)=47.2 (dots), or nearly 48 dots or more, in order to read an image by expanding a full width of the paper by 6 mm or greater. Table 1 shows values of a reading width and a factor of reduction to be executed in the compression-processing unit 11, calculated for each of the A3, A4, B4 and B5-size papers.

TABLE 1

| Paper size (width) | Reading width | Reduction factor |
| --- | --- | --- |
| A3-size 297 mm = 2339 dot | 3287 dot | 98.0% |
| A4-size 210 mm = 1654 dot | 1702 dot | 97.2% |
| B4-size 257 mm = 2024 dot | 2072 dot | 97.7% |
| B5-size 182 mm = 1433 dot | 1481 dot | 96.8% |

The expanded reading width is 3 mm at each of the two sides of paper in the width direction (6 mm in full width), as is obvious from Table 1, regardless of the paper size. Therefore, the reduction factor varies depending on the paper size when making a reduction into the regular size by the compression-processing unit 11 after the reading. That is, the smaller the paper size, the larger the reduction factor becomes. Hence, the control unit 10 in the control block diagram of FIG. 4 calculates a reduction factor to be utilized in the compression-processing unit 11, at the same time it determines a scanning area of the image-reading unit, as described above, when the paper-size sensor 2e inputs to the control unit 10 a size of the paper P placed on the hopper 2b. A reduction into the original regular size can be realized, when a result of the calculation is input to the compression-processing unit The image-reading unit reads a range that is greater than the regular size by 3 mm as shown in FIG. 5A also for a longitudinal direction of the paper P, and the image is reduced into the regular size in the end by the compression-processing unit 11. In this case, the entire area in the longitudinal direction of the paper P can be included within the regular size, if a reduction factor is determined based on a dimension in the width direction, since a dimension in the longitudinal direction is longer than that of the width, so as not to cause a deficiency in the image data.

In the structure as described above, when a paper P is loaded on the hopper 2b, and the guides 2d are pressed to contact with both sides in the width direction of the paper P, the paper-size sensor 2e inputs a determination signal to the control unit 10, which in turn determines a size of the paper P. The control unit 10 inputs the paper size as A4, for instance, to the image-reading unit (scanner heads 7a and 7b) and the compression-processing unit 11 respectively. The image reading unit sets an area, in which each side in both width direction and longitudinal direction is expanded by 3 mm, corresponding to a dimension of the paper P of A4-size as a scanning area. At the same time, the compression-processing unit 11 sets the reduction factor of an image data after reading, for 97.2% (refer to Table 1). In other words, the settings up to this point designate the image-reading unit a scanning area in width direction and longitudinal direction of the paper P of A4-size placed on the hopper 2b, as well as a reduction factor for reducing it into the regular size.

When the paper P is fed into the conveyor path by an operation of the paper feeding roller 3, it passes past the timing sensor 9 area, and the image is read by the scanner heads 7a and 7b. The paper P is then conveyed to the recovering tray 1b. In feeding the paper P from the hopper 2b, there are cases in that the paper P advances toward the normal direction, or the paper P skews. Operating condition of the image reading unit in each of these cases will be described by referring to FIG. 5A and FIG. 5B.

First, when the paper P1 is supplied straight from the hopper 2b in the regular direction, as shown in FIG. 3B, a leading side of the paper P1 cuts off all light paths of the light-emitting and the light-receiving components 9a-1 and 9b-1 of the timing sensor 9, and the timing sensor 9 inputs the passage time to the control unit 10. The control unit 10 then calculates a length of the paper P1 based on a signal input as the light paths are cleared when a tail side of the paper P1 passes through. A scanning length in the conveyance direction of the paper P by the scanner heads 7a and 7b is determined based on a result of this calculation. In this case, the length of scanning area in the conveyance direction of the paper P is a value equal to 6 mm (i.e. 3 mm×2) added to the longitudinal dimension of the paper P, as shown in FIG. 5A, since there is no skew with the paper P.

Since the scanning range is expanded by 3 mm at portions in width direction along both sides corresponding to the A4-size paper P, and the longitudinal dimension of the paper P is also covered in the scanning area, which is expanded by 3 mm each, an image on the paper P can be read as a whole. The image data read here is then reduced into the regular size by the compression-processing unit 11. That is, the image data in a size corresponding to the reading area shown by the dotted line in FIG. 5A is so processed as to become an image data having a number of pixels corresponding to the original size of A4, and the new image data is input to the host computer.

Figure 5B:
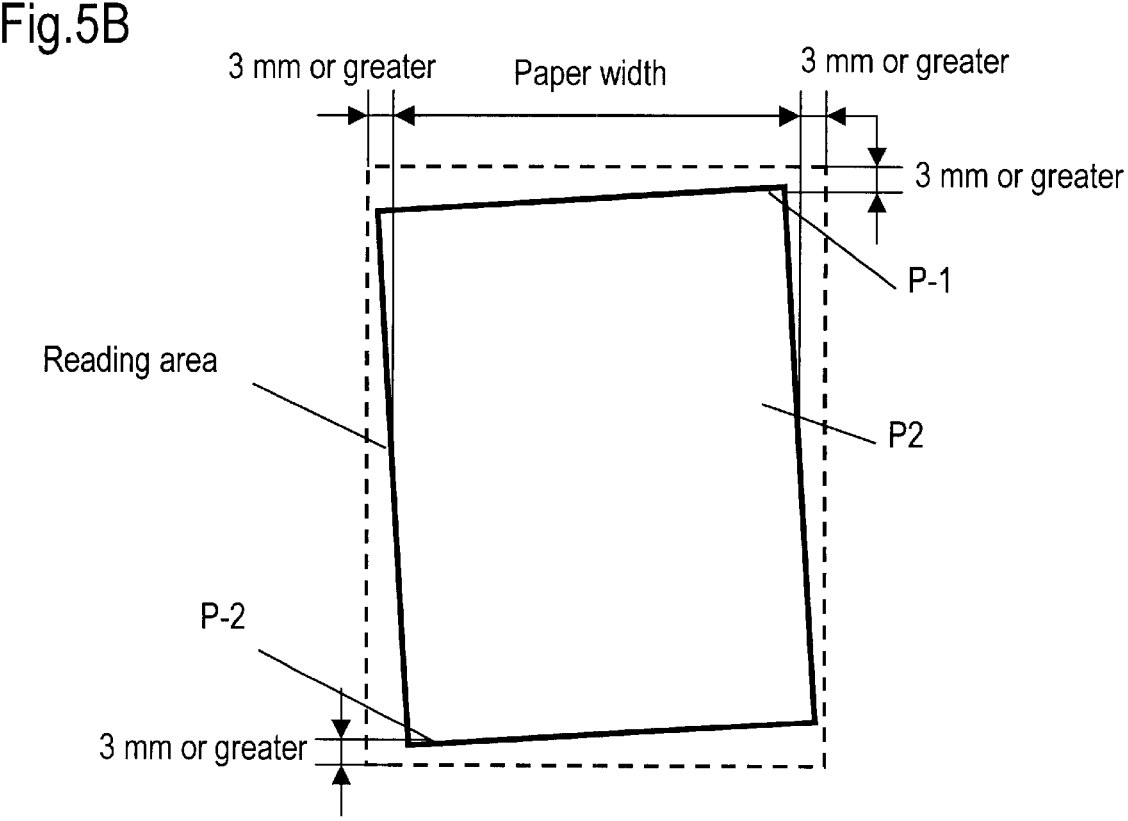
FIG. 5B is another diagrammatic view depicting the expanded reading area with respect to the regular size paper, as the paper skews.

On the other hand, when the fed paper P2 passes the timing sensor 9 area toward the scanner heads 7a and 7b while skewing obliquely, as shown in FIG. 3C, a right side edge of the paper P2 comes between a pair of the light-emitting and the light-receiving components 9a-1 and 9b-1 at the rightmost end in a row of the timing sensor 9, and cuts off the light path. At this moment, the timing sensor 9 inputs to the control unit 10 a signal signifying a passage time of the leading side of the paper P2. When a tail side of the paper P2 passes through, the light path of a pair of the light-emitting and the light-receiving components 9a-1 and 9b-1 located at the leftmost end is cleared, and another passage signal is input to the control unit 10, since the left side edge of the paper P2 passes through at last. The control unit 10 determines a length L in the paper-feeding direction by the passage signals as a portion near the right leading edge P-1 and another portion near the left tail edge P-2 pass the timing sensor 9, as shown in FIG. 5B. A value is calculated as a reading length by adding 6 mm (i.e. 3 mm×2) to the determined length L. In the meantime, a range that is expanded by 3 mm at each of both sides of the paper dimension determined indirectly by the paper-size sensor 2e is taken as an image-reading and scanning area, with respect to the width direction of the paper P2. Hence, the skew paper P2 can be covered within the reading area shown by a dotted line in FIG. 5B.

In this way, the image-reading unit is controlled to embrace the whole paper P in the scanning area, even when a skew occurs with the paper P, thereby realizing the reading of the image without making a partial deficiency in marginal area of the paper P2. After the reading, it is processed by the compression-processing unit 11 into an image data having a number of pixels corresponding to the original size of A4 of the paper P.

In this instance here, if the paper P is fed in the normal orientation as in the case of FIG. 5A, the scanner heads 7a and 7b are able to read the images with no deficiency of the images in the marginal area of the paper P, without even expanding the reading area. Thus, the control can be so designed as to carry out an expansion of the reading area, as shown in FIG. 5B, only when the paper P happens to skew. In this case, skew of the paper P can be detected by making a good use of a combination of the light-emitting component 9a-1 and the light-receiving component 9b-1 arranged in a row that is orthogonal to the paper-feeding direction for the timing sensor 9, as formerly described. Therefore, the control unit 10 can be made to read controls of the image-reading unit and the compression-processing unit 11, and to execute an expansion of the scanning area and a reduction after the reading, only when the paper P skews, by providing the control unit 10 with a calculation unit for a skew detection.

In the present invention, the apparatus is able to execute a reading without causing a deficiency of an image in marginal area of the paper, even if the paper happens to skew, since it reads the image by setting the reading area greater than a size of the fed paper, and thereby the apparatus can improve reliability of the image reading remarkably.

What is claimed is:

1. An image-reading apparatus for scanning a paper being fed therein with an image-reading unit, and outputting an image on said paper as an image data, wherein said image-reading apparatus is characterized by setting a reading area covered by said image-reading unit to a size greater than a size of said paper and by outputting, as an image data, a data derived by reducing the image read by said image-reading unit to said size of said paper, and setting a difference between a size of said paper and said reading area by a dimension common to papers of different sizes, and establishing a reduction factor of image read by said image-reading unit for each of said sizes of said papers.

2. An image-reading apparatus for scanning a paper being fed therein with an image-reading unit, and outputting an image on said paper as an image data, wherein said image-reading apparatus is characterized by setting a reading area covered by said image-reading unit to a size greater than a size of said paper, said reading area being 3 mm or greater, and setting a difference between a size of said paper and said reading area by a dimension common to papers of different sizes, and establishing a reduction factor of image read by said image-reading unit for each of said sizes of said papers.

* * * * *